(12) United States Patent
Lei et al.

(10) Patent No.: US 9,247,256 B2
(45) Date of Patent: Jan. 26, 2016

(54) PREDICTION METHOD USING SKIP CHECK MODULE

(71) Applicants: Zhijun Lei, Portland, OR (US); Dmitry E. Ryzhov, Moscow (RU)

(72) Inventors: Zhijun Lei, Portland, OR (US); Dmitry E. Ryzhov, Moscow (RU)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 13/719,682

(22) Filed: Dec. 19, 2012

(65) Prior Publication Data

US 2014/0169470 A1    Jun. 19, 2014

(51) Int. Cl.
| H04N 7/26 | (2006.01) |
| H04N 19/132 | (2014.01) |
| H04N 19/50 | (2014.01) |
| H04N 19/176 | (2014.01) |
| H04N 19/147 | (2014.01) |
| H04N 19/30 | (2014.01) |

(52) U.S. Cl.
CPC ....... *H04N 19/132* (2014.11); *H04N 19/00569* (2013.01); *H04N 19/147* (2014.11); *H04N 19/176* (2014.11); *H04N 19/30* (2014.11)

(58) Field of Classification Search
CPC ................................................ H04N 19/00569
USPC ..................................................... 375/240.16
See application file for complete search history.

(56) References Cited

U.S. PATENT DOCUMENTS

| 7,643,560 | B2 | 1/2010 | Hong et al. |
| 7,840,083 | B2 | 11/2010 | Han et al. |
| 7,991,236 | B2 | 8/2011 | Guo et al. |
| 8,054,885 | B2 | 11/2011 | Jeon et al. |
| 8,213,503 | B2 | 7/2012 | Tu et al. |
| 8,229,274 | B2 | 7/2012 | Jeon et al. |
| 2006/0133482 | A1 | 6/2006 | Park et al. |
| 2006/0262985 | A1 | 11/2006 | Chen et al. |
| 2007/0053426 | A1 | 3/2007 | Lee et al. |
| 2007/0086516 | A1 | 4/2007 | Lee et al. |

(Continued)

FOREIGN PATENT DOCUMENTS

| CN | 102025995 A | 4/2011 |
| WO | 2007076486 A2 | 7/2007 |

(Continued)

OTHER PUBLICATIONS

International Search Report and Written Opinion received for PCT Patent Application No. PCT/US2013/074059, mailed on Jul. 17, 2014, 11 pages.

(Continued)

*Primary Examiner* — Christopher S Kelley
*Assistant Examiner* — Jonathan Messmore
(74) *Attorney, Agent, or Firm* — Jordan IP Law, LLC (57) ABSTRACT

Methods and systems may provide for utilizing a skip check module located in a video processing component to facilitate Scalable Video Coding (SVC) by determining cost relating to compression techniques. In one example, the method may include determining a location value associated with a current macro-block (MB), determining a source surface value associated with the current MB, determining a reference surface value associated with the current MB, determining a skip center value associated with the current MB, and calculating a cost value for utilizing a compression technique using the location value, the source surface value, the reference surface value, and the skip center value.

29 Claims, 4 Drawing Sheets

(56) References Cited

U.S. PATENT DOCUMENTS

| | | |
|---|---|---|
| 2007/0230575 A1 | 10/2007 | Han |
| 2009/0074061 A1 | 3/2009 | Yin et al. |
| 2009/0116558 A1 | 5/2009 | Chen et al. |
| 2009/0129468 A1 | 5/2009 | Park et al. |
| 2009/0168875 A1 | 7/2009 | Park et al. |
| 2009/0285299 A1 | 11/2009 | Chen et al. |
| 2010/0061447 A1 | 3/2010 | Tu et al. |
| 2010/0158127 A1 | 6/2010 | Kim et al. |
| 2011/0216833 A1 | 9/2011 | Chen et al. |
| 2012/0063695 A1 | 3/2012 | Wu et al. |
| 2013/0229485 A1* | 9/2013 | RUSANOVSKYY et al. ... 348/43 |

FOREIGN PATENT DOCUMENTS

| | | |
|---|---|---|
| WO | 2010/008210 A2 | 1/2010 |
| WO | 2014/099478 A1 | 6/2014 |

OTHER PUBLICATIONS

Schwarz et al. "Overview of the Scalable Video Coding Extension of the H.264/AVC Standard," IEEE Transactions on Circuits and Systems for Video Technology, Sep. 2007, 18 pages.

* cited by examiner

PREDICTION METHOD USING SKIP CHECK MODULE

BACKGROUND

Advanced Video Coding (AVC, e.g., H.264/MPEG-4) is a video coding standard used for recording, compression, and distribution of high definition video. Over time, a significant number of hardware and software components have been developed to support AVC.

Scalable Video Coding (SVC) is an extension of H.264/AVC video coding standard. SVC may allow multi-layered video streams to be encoded into a single bitstream composed of a base layer and additional enhancement layers with different resolutions, frame rates, and quality.

Hardware and software components that may be initially designed to support AVC may need to conduct additional, computationally-intensive operations to support SVC. Previously, dedicated software components may have conducted these computationally-intensive operations, thereby significantly increasing software complexity and memory bandwidth demands.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Scalable Video Coding (SVC) may allow scalability in temporal, spatial and video quality domains. Specifically, SVC may allow a multi-layered video stream to be encoded in a single bitstream, including a base layer and optional additional enhancement layers. In SVC, information from a lower layer (e.g., a base layer, a reference layer) may be used to predict information relating to a higher layer (e.g., an enhancement layer).

Inter-Layer Base Mode Prediction (ILBP) may be one of the key compression techniques used in SVC. In ILBP, for SVC enhancement layers, a new MB type may be introduced, which may be signaled by a syntax element called a base mode flag. When a base mode flag in a current MB header syntax may be equal to 1, a SVC decoder may check the following two cases.

If a corresponding co-located MB in the SVC reference layer may be an intra-coded MB, a current MB may be treated as intra-coded MB, and may be predicted from a reference layer co-located MB. This mode may also referred to as "I-BL mode", and this type of inter layer prediction may also be referred to as "Inter-Layer Intra Prediction".

On the other hand, if a corresponding co-located MB in the SVC reference layer may be an inter-coded MB, a current MB may be treated as inter-coded MB as well. The partitioning information and motion vectors of the current MB, along with the associated reference indexes, may be derived from corresponding data of the co-located MB in the reference layer. This mode may also be referred to as "reference layer skip mode", and this type of inter layer prediction may also be referred to as "Inter-Layer Motion Prediction".

In order to determine what encoding mode should be used on the current MB, a mode decision algorithm of a SVC encoder may calculate a distortion/cost for different encoding modes and choose an encoding mode with the lowest distortion/cost. For MBs in the SVC enhancement layer, besides calculating the distortion/cost for the different encoding modes in the existing AVC standard, the following distortion/costs for ILBP may be calculated as well.

So, if the corresponding co-located MB in the SVC reference layer is an intra-coded MB, the distortion between the current MB and the co-located MB in the SVC reference layer may be calculated.

On the other hand, if the corresponding co-located MB in the SVC reference layer is an inter-coded MB, motion vectors, reference indexes and MB partitioning information of the co-located MB in the SVC reference layer may be used for the current MB. At this point, motion compensation may be carried out on the reference frame, and distortion/cost value based on a motion compensation result may be calculated.

Now, in order to calculate a cost/distortion value, a software module may need to fetch current MB pixel data, along with predicted pixel data from either a reference layer co-located MB (in the case of I-BL mode), or from a reference frame (in the case of reference layer skip mode). This may introduce significant computational complexity and memory bandwidth requirements. In particular, in the reference layer skip mode, motion compensation may require fetching pixel data from a reference frame based on motion vectors, and interpolating pixel data based on the motion vectors. As will be discussed in greater detail, a skip check module located in a video processing component (e.g., a video motion estimation module) may be used to facilitate the cost calculations.

Figure 1:
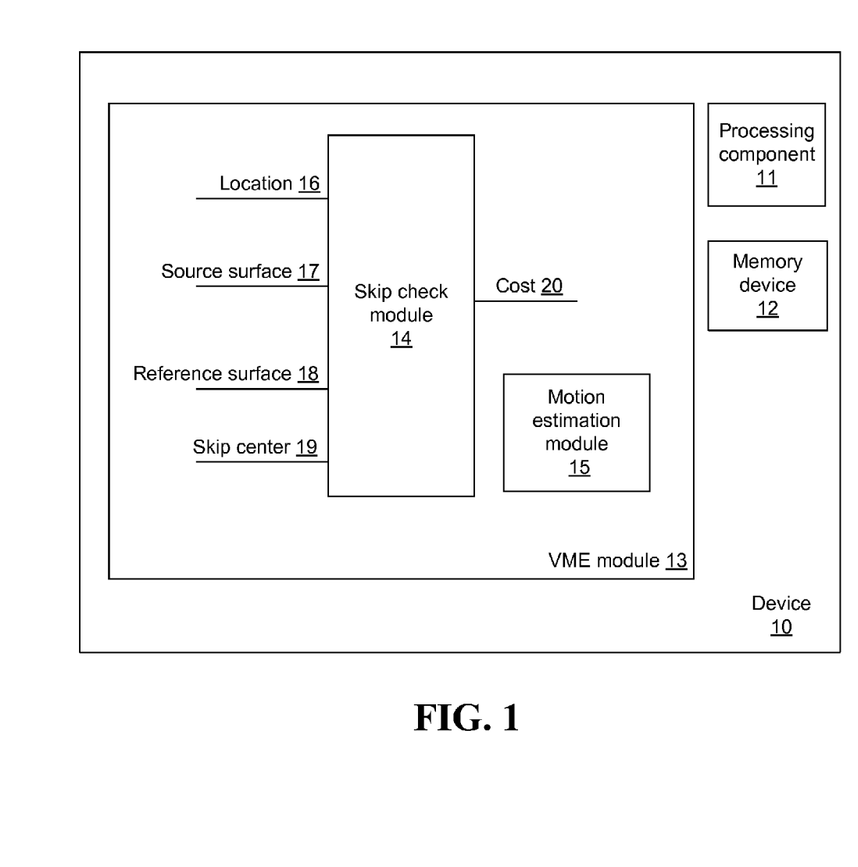
FIG. 1 is a block diagram of an example of a device configured to utilize a skip check module to facilitate SVC to an embodiment.

In the case of a typical AVC encoder, a skip check module may be used to evaluate a distortion/cost of encoding a current MB into AVC skip mode. Turning now to FIG. 1, a device 10 configured to utilize a skip check module to facilitate SVC is shown. The device 10 may include a processing component 11, a memory device 12, and a video motion estimation (VME) module 13.

The processing component 11 may include at least one computer processor that may be utilized to execute computer-readable executable instructions. The memory device 12 may be any component or device capable of storing data.

The VME module 13 may be a processing component configured to, among other things, estimate motion (i.e., displacement) between a first block of pixels and a second block of pixels. The VME module may include a skip check module 14 and a motion estimation module 15. The motion estimation module 15 may be an image processing component configured to, among other things, facilitate transformation of a first image to a second image using motion vectors.

The skip check module 14 may, among other things, utilize relevant information relating to the various coding types to determine one or more cost values to facilitate determination of an appropriate compression technique. In this example, the skip checks module 14 may include a location input interface 16, a source surface input interface 17, a reference surface input interface 18, a skip center input interface 19, and a cost output interface 20.

The location input interface 16 may be configured to receive a location input value indicating coordinates (e.g., $MB_x$, $MB_y$) of a current MB in a source surface. The source surface input interface 17 may be configured to receive a source surface input value indicating a pixel surface for a current frame that may be encoded.

The reference surface input interface 18 may be configured to receive a reference surface input value indicating a pixel surface for one or more reference frames. As will be discussed in greater detail, in one example, when conducting a motion estimation calculation, the reference surface input 18 may be configured to utilize a bi-directional analysis. The analysis may be bi-directional in that it may utilize a first list of one or more past (i.e., previous) frames, and a second list of one or more future (i.e., next) frames. The past frames may constitute a first list of reference direction, and the future frames may constitute a second list of reference direction.

The skip center input interface 19 may be configured to receive an input value indicating a skip center value. In SVC, determining a skip center may be dependent on the type of coding (e.g., inter-coding, intra-coding). So, for example, when utilizing the intra-coding coding type, the skip center associated with a current MB may be set to zero (e.g., [0,0]).

On the other hand, when utilizing the inter-coding coding type, the skip center associated with a current MB may be based on more than one associated motion vectors from a co-located MB in a reference layer. For example, take the case of an 8×8 MB of pixels in a co-located MB in a reference layer. SVC may allow the partitioning of the 8×8 co-located MB into four 4×4 sub-blocks, each of which may include an associated motion vector.

In the case where a block of pixels includes one or more associated motion vectors, the skip check module 14 may designate one motion vector to represent the entire block of pixels. So, in this case, the skip check module 14 may designate the coordinates of the upper left sub-block as the skip center for the 8×8 co-located MB in a reference layer, and the associated motion vector for the upper left sub-block may be used as the motion vector representing the 8×8 co-located MB in a reference layer. Upon receiving a location input value, a source surface input value, a reference surface input value, and a skip center value, the skip check module 14 may be configured to output a cost value via the cost value interface 20.

Figure 2:
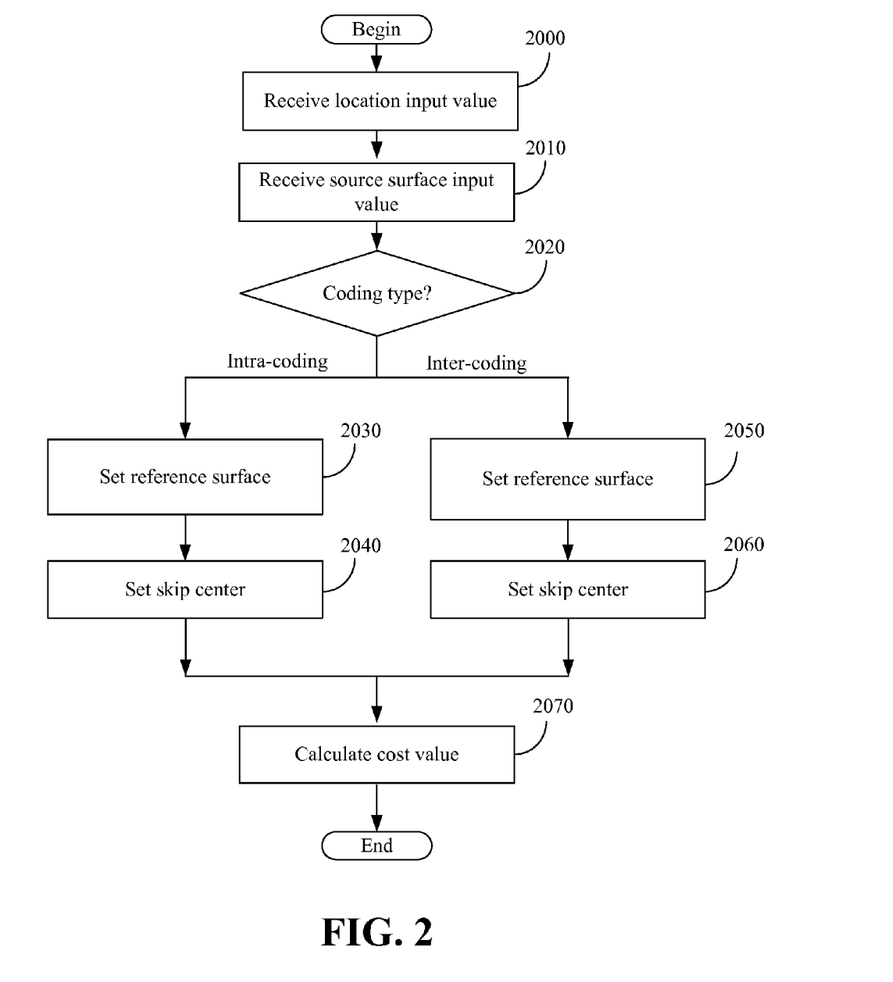
FIG. 2 is a flowchart of an example of a method of utilizing a skip check module to facilitate SVC standard according to an embodiment.

Turning now to FIG. 2, a flowchart of an example of a method of utilizing a skip check module to facilitate SVC according to an embodiment is shown. In this example, a skip check module, such as the skip check module 14 (FIG. 2), may utilize one or more relevant inputs, such as the skip center input interface 18 (FIG. 2), to calculate a cost of using a compression technique. In this example, the compression technique may be ILBP. Also, in this example, a current MB of pixels may be associated with a co-located 8×8 MB from a reference layer. The reference layer co-located 8×8 MB may be partitioned into 4 4×4 sub-blocks of pixels.

The method might be implemented as a set of logic instructions stored in a machine- or computer-readable storage medium such as, for example, random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as, for example, Java, Smalltalk, C++ or the like and conventional procedural programming languages, such as the "C" programming language or similar programming languages.

At processing block 2000, the skip check module may receive a location input value via a location input interface, such as the location input interface 16 (FIG. 2). At processing block 2010, the skip center module may receive a source surface input value via a source surface input interface, such as the source surface input interface 17 (FIG. 2).

At processing block 2020, the processing may continue based on whether a co-located MB from a reference layer is intra-coded or inter-coded. In particular, as will be discussed in greater detail, determining a reference surface value and a skip center value may be based on whether a co-located MB from a reference layer is intra-coded or inter-coded.

If the co-located MB from the reference layer is intra-coded, then at processing block 2030, a reference surface value may be set to be a pixel surface of a reconstructed reference layer. The skip check module may be configured to receive the reference surface value via a reference surface input, such as the reference surface input 18 (FIG. 1).

In addition, at processing block 2040, if the co-located MB from the reference layer is intra-coded, a skip center value may be set to zero (i.e., [0,0]). The skip check module may be configured to receive the skip center value via a skip center input, such as the skip center input 19 (FIG. 1).

On the other hand, if the co-located MB from the reference layer is inter-coded, then at processing block 2050, a reference surface value may be based on a pixel surface for one or more reference frames (e.g., may utilize a bi-directional analysis). In this example, the reference surface input may utilize a first list of reference direction including a first list of one or more past frames, and a second list of reference direction including a second list of one or more future frames.

In addition, at processing block 2060, if the co-located MB from the reference layer is inter-coded, one or more skip centers may be set. As discussed above, the skip center may correspond to one or more motion vectors of one or more partitioned sub-blocks of the co-located MB in the reference layer. So, in this example, the skip check module may designate the upper left 4×4 sub-block to represent the 8×8 co-located MB from the reference layer. Consequently, the coordinates of the upper left sub-block may be used as the skip center.

At processing block 2070, the skip check module may utilize the location input value, the source surface input value, the reference surface value, and the skip center value to calculate a cost value associated with ILBP. The cost value may be output via a cost output interface, such as the cost output interface 20 (FIG. 1). This cost value may then be used to determine whether ILBP should be used.

Figure 3:
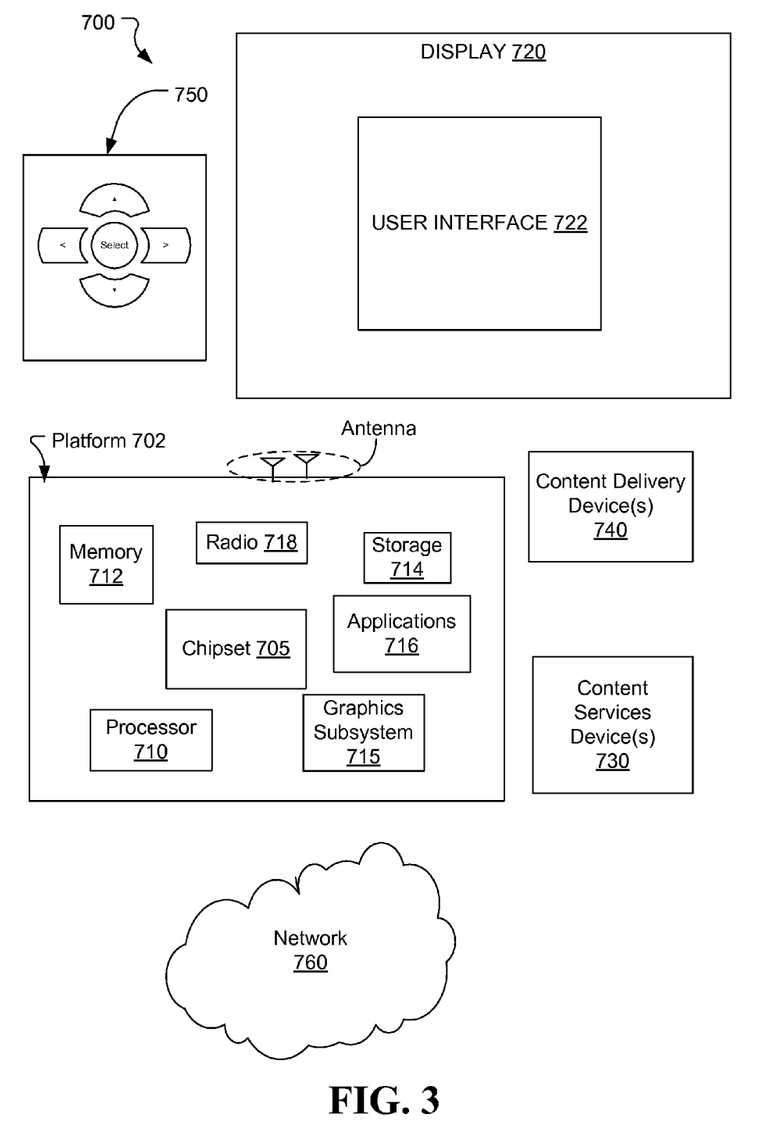
FIG. 3 is a block diagram of an example of a system having a skip check module according to an embodiment.

FIG. 3 illustrates an embodiment of a system 700 that may be used to encode and/or decode a video signal as described herein. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to display video bitstreams as described herein.

In embodiments, the system 700 comprises a platform 702 coupled to a display 720. Platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include portions of the device 10 (FIG. 1), including the skip check module 14 (FIG. 1), already discussed. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720.

Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off" In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
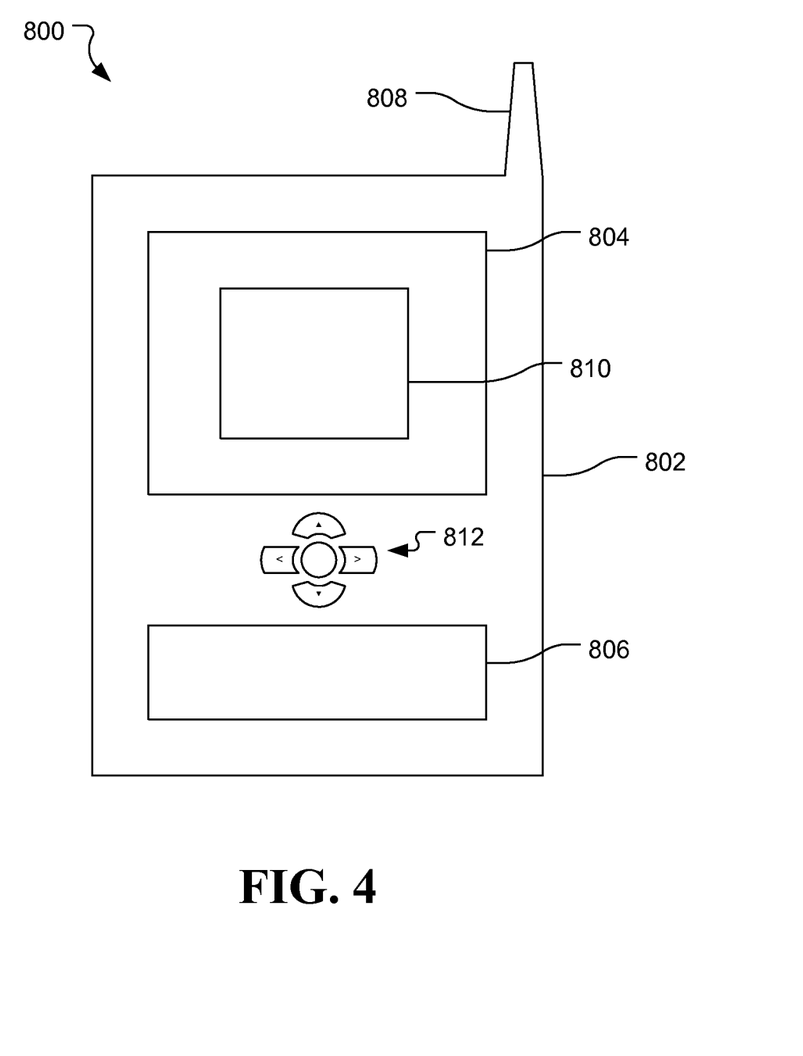
FIG. 4 is a block diagram of an example of a system having a small form factor according to an embodiment.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 4, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Thus, techniques described herein may provide for state CABAC state saving in video streams such as, for example, H.264 video streams (e.g., Recommendation H.264, Advanced video coding for generic audiovisual services, Annex G, ITU-T, 01/2012). Additionally, video data reconstruction may be implemented in cases of lost packets, based on saving/transmitting intermediate states of the encoder. Moreover, side information may be selected for data reconstruction based on frame type, the size of the compressed frame, and the bit size if the compressed state information. Techniques may also provide for using channel quality information to determine whether to send side information.

Embodiments may therefore provide for a method of conducting video processing, comprising determining a location value associated with a current macro-block (MB), wherein the current MB is encoded using scalable video coding (SVC), determining a source surface value associated with the current MB, and determining if a co-located MB from a reference layer is intra-coded or inter-coded. In addition, the method may have provide for determining a reference surface value associated with the current MB and determining a skip center value associated with the current MB. The method may also provide for providing the location value, the source surface value, the reference surface value, and the skip center value to a skip check module and calculating, by the skip check module, a first cost value for utilizing a compression technique, wherein the first cost value is based on encoding distortion between the current MB and the co-located MB from the reference layer.

In a first example, the method may also include determining, if the co-located MB from the reference layer is an intra-coded MB, the reference surface value based on a pixel surface of a reference layer associated with the current MB.

In a second example, the method may include setting, if the co-located MB from the reference layer is an intra-coded MB, the skip center value to be zero.

In another example, the method may include determining, if the co-located MB from the reference layer is an inter-coded MB, the reference surface value based on a pixel surface of one or more reference frames.

In addition, in another example, one or more reference frames includes a past frame and a future frame.

In still another example, the method may include determining, if the co-located MB from the reference layer is an inter-coded MB, the skip center value based on a motion vector of a predetermined partition of the co-located MB from the reference layer.

In yet another example, the method may include utilizing the first cost value to determine if Inter Layer Base Mode Prediction (ILBP) is to be used.

In another example, the method may include calculating, by the skip check module, a second cost value associated with advanced video coding (AVC).

Another embodiment may provide for an apparatus comprising a video motion module including a motion estimation module and a skip check module. The skip check module may include a location value module to determine a location value associated with a current macro-block (MB), wherein the current MB is encoded using scalable video coding (SVC), a source surface module to determine a source surface value associated with the current MB, a reference surface module to determine a reference surface value associated with the current MB. The skip check module may also include a skip center module to determine a skip center value associated with the current MB and a cost value module to calculate a first cost value relating to utilizing a compression technique based on the location value, the source surface value, the reference surface value, and the skip center value, wherein the cost value is based on an encoding distortion between the current MB and a co-located MB from a reference layer.

In a first example, the skip check module further includes a motion vector module to estimate a motion vector associated with the current MB.

In a second example, the reference surface module is to predict the reference surface value based on a pixel surface of a reference layer associated with the current MB if the co-located MB from the reference layer is an intra-coded MB.

In another example, the skip center module is to set the skip center value to zero if the co-located MB from the reference layer is an intra-coded MB.

In still another example, the reference surface module is to determine the reference surface value based on a pixel surface of one or more reference frames if the co-located MB from the reference layer is an inter-coded MB, and wherein the one or more reference frames is to include a past frame and a future frame.

In one example, the skip center module is to calculate the skip center value based on a motion vector of a predetermined partition of the co-located MB from the reference layer if the co-located MB from the reference layer is an inter-coded MB.

In yet another example, the skip check module is to calculate the first cost value to determine if Inter Layer Base Mode Prediction (ILBP) is to be used.

In still another example, the skip check module is to calculate a second cost value associated with advanced video coding (AVC).

Yet another example may provide for a computer readable storage medium comprising a set of instructions which, if executed by a processor, cause a computer to estimate a motion vector associated with a current macro-block (MB) based on a coding type of a co-located MB in a scalable video coding (SVC) reference layer and calculate a first cost value for utilizing a compression technique. The calculation of the cost value may be based on a location value associated with the current MB, a source surface value associated with the current MB, a reference surface value associated with the current MB, and a skip center value associated with the current MB, wherein the cost value is based on a distortion between the current MB and the co-located MB from the SVC reference layer.

In one example, the instructions, if executed, cause a computer to estimate a motion vector associated with the current MB.

In another example, the instructions, if executed, cause a computer to predict the reference surface value based on a pixel surface of a reference layer associated with the current MB if the co-located MB from the reference layer is an intra-coded MB.

In another example, the instructions, if executed, cause a computer to set the skip center value to zero if the co-located MB from the reference layer is an intra-coded MB.

In still another example, the instructions, if executed, cause a computer to determine the reference surface value based on a pixel surface of one or more reference frames if the co-located MB from the reference layer is an inter-coded MB, and wherein the one or more reference frames is to include a past frame and a future frame.

In yet another example, the instructions, if executed, cause a computer to calculate the skip center value based on a motion vector of a predetermined partition of the co-located MB from the reference layer if the co-located MB from the reference layer is an inter-coded MB.

In one example, the instructions, if executed, cause a computer to calculate the first cost value to determine if Inter Layer Base Mode Prediction (ILBP) is to be used.

In still another example, the instructions, if executed, cause a computer to calculate a second cost value associated with advanced video coding (AVC).

Still another embodiment may provide for a system comprising a processing component, a network controller to obtain a video bitstream, and a graphics subsystem including a skip check module. The skip check module may include a video motion module including a motion estimation module and a skip check module. The skip check module may include a skip center module to estimate a skip center associated with a current macro-block (MB) based on a coding type of a co-located MB in a scalable video coding (SVC) reference layer. The skip check module may also include a cost value module to calculate a cost value for utilizing a compression technique based a location value associated with the current MB, a source surface value associated with the current MB, a reference surface value associated with the current MB, and a skip center value associated with the current MB, wherein the cost value is based on a distortion between the current MB and the co-located MB from the SVC reference layer.

In one example, the skip center module is to set the skip center value to zero if the co-located MB from the reference layer is an intra-coded MB.

In still another example, the skip center module is to calculate the skip center value based on a motion vector of a predetermined partition of the co-located MB from the reference layer if the co-located MB from the reference layer is an inter-coded MB.

In another example, the skip check module further includes a reference surface module is to predict the reference surface value based on a pixel surface of a reference layer associated with the current MB if the co-located MB from the reference layer is an intra-coded MB.

In yet another example, the reference surface module is to determine the reference surface value based on a pixel surface of one or more reference frames if the co-located MB from the reference layer is an inter-coded MB, and wherein the one or more reference frames is to include a past frame and a future frame.

In one more example, the skip check module is to calculate the cost value to determine if Inter Layer Base Mode Prediction (ILBP) is to be used.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method, comprising:
   determining a location value associated with a current macro-block (MB), wherein the current MB is encoded using scalable video coding (SVC);
   determining a source surface value associated with the current MB;
   determining if a co-located MB from a reference layer is intra-coded or inter-coded;
   determining a reference surface value associated with the current MB;
   determining a skip center value associated with the current MB;
   providing the location value, the source surface value, the reference surface value, and the skip center value to a skip check module; and
   calculating, by the skip check module, a first cost value for utilizing a compression technique, wherein the first cost value is based on encoding distortion between the current MB and the co-located MB from the reference layer.

2. The method of claim 1, further including determining, if the co-located MB from the reference layer is an intra-coded MB, the reference surface value based on a pixel surface of a reference layer associated with the current MB.

3. The method of claim 1, further including setting, if the co-located MB from the reference layer is an intra-coded MB, the skip center value to be zero.

4. The method of claim 1, further including determining, if the co-located MB from the reference layer is an inter-coded MB, the reference surface value based on a pixel surface of one or more reference frames.

5. The method of claim 4, wherein the one or more reference frames includes a past frame and a future frame.

6. The method of claim 1, further including determining, if the co-located MB from the reference layer is an inter-coded MB, the skip center value based on a motion vector of a predetermined partition of the co-located MB from the reference layer.

7. The method of claim 1, further including utilizing the first cost value to determine if Inter Layer Base Mode Prediction (ILBP) is to be used.

8. The method of claim 1, further including calculating, by the skip check module, a second cost value associated with advanced video coding (AVC).

9. An apparatus comprising:
   a video motion module including a motion estimation module and a skip check module, wherein the skip check module includes,
   a location value module to determine a location value associated with a current macro-block (MB), wherein the current MB is encoded using scalable video coding (SVC);
   a source surface module to determine a source surface value associated with the current MB;
   a reference surface module to determine a reference surface value associated with the current MB;
   a skip center module to determine a skip center value associated with the current MB; and
   a cost value module to calculate a first cost value relating to utilizing a compression technique based on the location value, the source surface value, the reference surface value, and the skip center value, wherein the cost value is based on an encoding distortion between the current MB and a co-located MB from a reference layer.

10. The apparatus of claim 9, wherein the skip check module further includes a motion vector module to estimate a motion vector associated with the current MB.

11. The apparatus of claim 9, wherein the reference surface module is to predict the reference surface value based on a pixel surface of a reference layer associated with the current MB if the co-located MB from the reference layer is an intra-coded MB.

12. The apparatus of claim 9, wherein the skip center module is to set the skip center value to zero if the co-located MB from the reference layer is an intra-coded MB.

13. The apparatus of claim 9, wherein the reference surface module is to determine the reference surface value based on a pixel surface of one or more reference frames if the co-located MB from the reference layer is an inter-coded MB, and wherein the one or more reference frames is to include a past frame and a future frame.

14. The apparatus of claim 9, wherein the skip center module is to calculate the skip center value based on a motion vector of a predetermined partition of the co-located MB from the reference layer if the co-located MB from the reference layer is an inter-coded MB.

15. The apparatus of claim 9, wherein the skip check module is to calculate the first cost value to determine if Inter Layer Base Mode Prediction (ILBP) is to be used.

16. The apparatus of claim 9, wherein the skip check module is to calculate a second cost value associated with advanced video coding (AVC).

17. A non-transitory computer readable storage medium comprising a set of instructions which, if executed by a processor, cause a computer to:
   estimate a motion vector associated with a current macro-block (MB) based on a coding type of a co-located MB in a scalable video coding (SVC) reference layer; and
   calculate a first cost value for utilizing a compression technique based a location value associated with the current MB, a source surface value associated with the current MB, a reference surface value associated with the current MB, and a skip center value associated with the current MB, wherein the cost value is based on a distortion between the current MB and the co-located MB from the SVC reference layer.

18. The medium of claim 17, wherein the instructions, if executed, cause a computer to predict the reference surface value based on a pixel surface of a reference layer associated with the current MB if the co-located MB from the reference layer is an intra-coded MB.

19. The medium of claim 17, wherein the instructions, if executed, cause a computer to set the skip center value to zero if the co-located MB from the reference layer is an intra-coded MB.

20. The medium of claim 17, wherein the instructions, if executed, cause a computer to determine the reference surface value based on a pixel surface of one or more reference frames if the co-located MB from the reference layer is an inter-coded MB, and wherein the one or more reference frames is to include a past frame and a future frame.

21. The medium of claim 17, wherein the instructions, if executed, cause a computer to calculate the skip center value based on a motion vector of a predetermined partition of the co-located MB from the reference layer if the co-located MB from the reference layer is an inter-coded MB.

22. The medium of claim 17, wherein the instructions, if executed, cause a computer to calculate the first cost value to determine if Inter Layer Base Mode Prediction (ILBP) is to be used.

23. The medium of claim 17, wherein the instructions, if executed, cause a computer to calculate a second cost value associated with advanced video coding (AVC).

24. A system comprising:
a processing component;
a network controller to obtain a video bitstream; and
a graphics subsystem having,
  a video motion module including a motion estimation module and a skip check module, wherein the skip check module includes,
  a skip center module to estimate a skip center associated with a current macro-block (MB) based on a coding type of a co-located MB in a scalable video coding (SVC) reference layer; and
  a cost value module to calculate a cost value for utilizing a compression technique based a location value associated with the current MB, a source surface value associated with the current MB, a reference surface value associated with the current MB, and a skip center value associated with the current MB, wherein the cost value is based on a distortion between the current MB and the co-located MB from the SVC reference layer.

25. The system of claim 24, wherein the skip center module is to set the skip center value to zero if the co-located MB from the reference layer is an intra-coded MB.

26. The system of claim 24, wherein the skip center module is to calculate the skip center value based on a motion vector of a predetermined partition of the co-located MB from the reference layer if the co-located MB from the reference layer is an inter-coded MB.

27. The system of claim 24, wherein the skip check module further includes a reference surface module is to predict the reference surface value based on a pixel surface of a reference layer associated with the current MB if the co-located MB from the reference layer is an intra-coded MB.

28. The system of claim 27, wherein the reference surface module is to determine the reference surface value based on a pixel surface of one or more reference frames if the co-located MB from the reference layer is an inter-coded MB, and wherein the one or more reference frames is to include a past frame and a future frame.

29. The system of claim 24, wherein the skip check module is to calculate the cost value to determine if Inter Layer Base Mode Prediction (ILBP) is to be used.

* * * * *